United States Patent [19]

Mountain

[11] Patent Number: 4,601,282
[45] Date of Patent: Jul. 22, 1986

[54] AUTOMATIC SOLAR COLLECTOR SYSTEM
[75] Inventor: John F. Mountain, Inverness, Fla.
[73] Assignee: Total Solar Energy Systems, Inc., Crystal River, Fla.
[21] Appl. No.: 630,283
[22] Filed: Jul. 12, 1984
[51] Int. Cl.⁴ .................................................. F24J 2/08
[52] U.S. Cl. ..................................... 126/440; 126/425; 126/437; 250/203 R
[58] Field of Search ............... 126/440, 437, 424, 425, 126/438; 250/203 R

[56] References Cited

U.S. PATENT DOCUMENTS

| | | | |
|---|---|---|---|
| 4,038,972 | 8/1977 | Orrison | 126/425 |
| 4,135,493 | 1/1979 | Kennedy | 126/425 |
| 4,137,899 | 2/1979 | Weslow | 126/440 |
| 4,187,123 | 2/1980 | Diggs | 126/425 X |
| 4,300,537 | 11/1981 | Davis | 126/437 |
| 4,324,227 | 4/1982 | Mountain | 126/437 |
| 4,324,947 | 4/1982 | Dumbeck | 126/424 X |
| 4,424,802 | 1/1984 | Winders | 126/425 |

*Primary Examiner*—Larry Jones
*Attorney, Agent, or Firm*—Pettis & McDonald

[57] ABSTRACT

An automatic solar collector system useful for heating and storing a heating fluid such as, for example, water. The automatic solar collector system of this invention is characterized by its construction including a photo cell-actuated hydraulic cylinder whereby the collector panel may be positioned at an angle to focus the sun's rays onto the fluid conduit disposed within the collector panel. Overall operation of the automatic solar collector system of this invention is regulated by a clock timer, and the entire system is essentially self-contained so that it may easily be moved from one location to another, or put in parts to be attached to a home or a building with the tank and controls below the roof.

6 Claims, 3 Drawing Figures

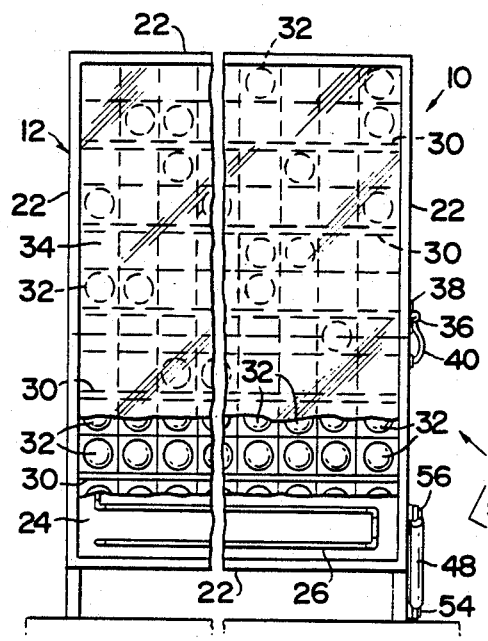
FIG. 1
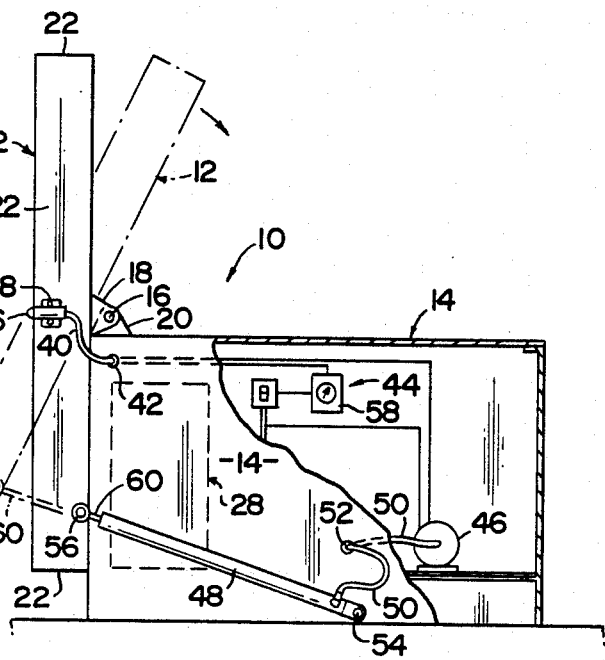
FIG. 2
FIG. 3
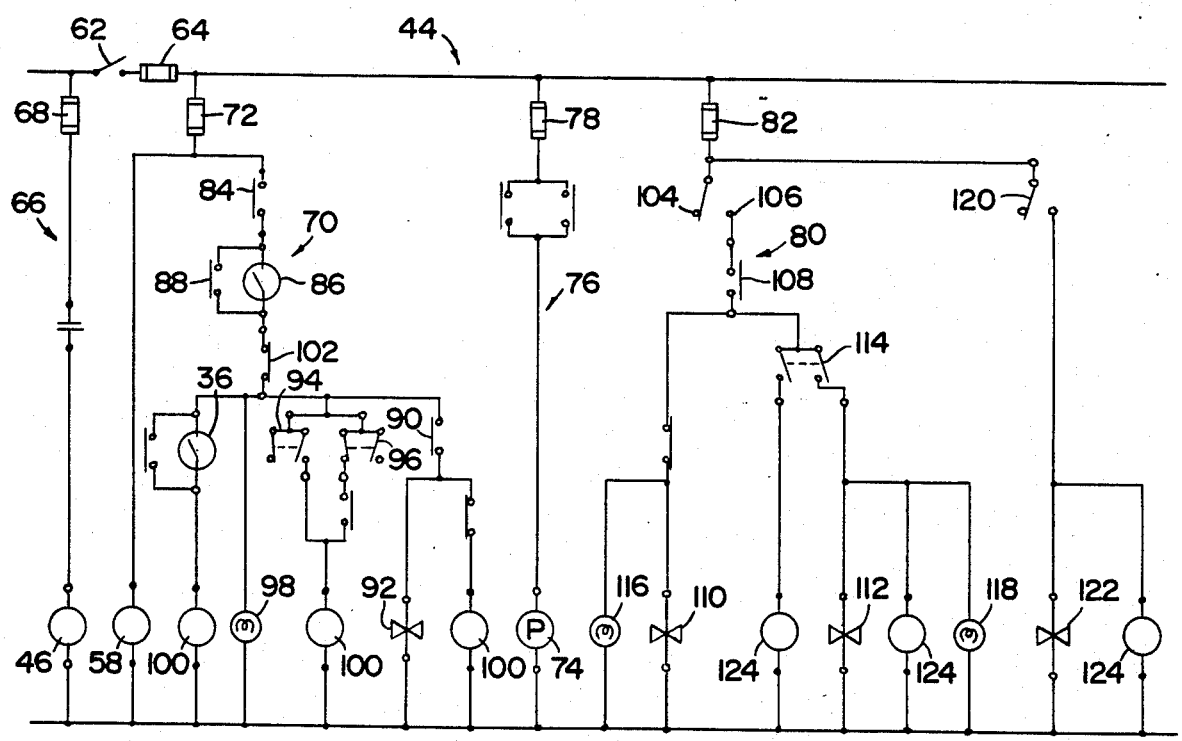

AUTOMATIC SOLAR COLLECTOR SYSTEM

BACKGROUND OF THE INVENTION

1. Field of the Invention

The automatic solar collector system of this invention is primarily intended for collecting solar energy in a heat transfer fluid and for storing the heated fluid for subsequent use. While not limited thereto, a primary utility for the automatic solar collector system of this invention is the use of the sun's rays for heating water. The collector system of this invention is characterized by its substantially self-contained construction and its inclusion of photo cell-actuated means for positioning the collector panel so that the sun's rays are focused through a plurality of lenses onto the fluid conduit through which the transfer fluid is caused to circulate.

2. Description of the Prior Art

Numerous prior art devices are, of course, well known for the purpose of utilizing solar energy for the purpose of transferring and collecting heat in a heat exchange fluid. Not surprisingly, the vast majority of such devices are often disclosed for use in providing hot water for both domestic and commercial purposes. In fact, patent literature disclosing various constructions for solar water heaters date at least from the late nineteenth century.

Almost without exception, today's solar collectors intended for home and light commerical uses are designed for relatively permanent installation, usually on the roof of the structure to which the water will be supplied. Furthermore, virtually all solar water heaters comprise a panel for absorbing the sun's heat energy, for transferring that heat energy to a fluid, and for storing that fluid for subsequent end use. Recent engineering advances in the construction of solar collector panels have introduced the use of means for concentrating, magnifying, or focusing the sun's heat energy onto the heat transfer fluid. For example, U.S. Pat. No. 4,071,016 discloses the use of a panel of triangular cross section having a series of magnifying glasses arranged to focus the sun on a heat absorbing material over which a stream of air is blown in order to absorb the heat from the heat absorbing material into the air. Yet another means for concentrating the sun's energy is disclosed in my prior U.S. Pat. No. 4,324,227. According to the disclosure of that patent, a plurality of lenses are incorporated into the cover of the collector panel for focusing the sun's heat energy upon fluid flowing through the panel.

Also disclosed in the prior art are various means whereby the collector panel may be caused to follow, or track, the sun's movement across the location of the collector. However, such tracking installations are of necessity quite complex and expensive, and are therefore not generally regarded as suitable for average residential and commercial installations. Thus, of necessity, most of today's residential and commercial solar water heating installations are of reduced efficiency because of their stationary installation.

Thus, while a great variety of solar collector constructions are know according to the prior art, it is clear that there still remains significant room for improvement in means for enhancing not only the efficiency of collectors, but also their economy any availability in a variety of end use applications.

SUMMARY OF THE INVENTION

The automatic solar collector system of this invention is of the type primarily intended for use in collecting solar energy in a heat transfer fluid and in storing the heated fluid for subsequent use. While the solar collector system of this invention comprises a solar collector panel including means for focusing the sun's rays upon a fluid conduit containing the heat exchange fluid in a fashion somewhat analogous to that disclosed and claimed in my prior U.S. Patent referred to above, the system of this invention is automatic in that its operation is controlled by a clock timer, and in that the incidence angle defined by the front plane of the collector panel and the sun's rays is optimized by use of a photo cell operatively connected to an hydraulic cylinder which is utilized to position the collector panel in predetermined relation to those rays.

The solar collector panel of this invention is defined by a substantially rectangular support frame, the side walls and back of which are insulated and front of which is enclosed by a plurality of, for example, fresnel lenses. Disposed within the collector panel is a continuous fluid conduit through which the transfer fluid is circulated. Accordingly, one end of the conduit is operatively connected to a fluid supply while the other end is operatively connected to the system's storage tank. The solar collector panel is pivotally mounted to a panel box, the interior of which contains temperature sensors, comparator units, and valves for regulating fluid flow through the fluid conduit as well as an insulated heated fluid storage tank.

The means for positioning the solar collector panel in predetermined relation to the sun's rays comprises an hydraulic cylinder operatively disposed in interconnecting relation between the panel box and the collector panel. Operation of the hydraulic cylinder is regulated by a photo cell mounted on the collector panel and operatively connected to the cylinder whereby the plane of the collector panel lenses will be positioned in substantially normal relation to the sun's incidence rays.

Overall operation of the automatic solar collector system of this invention in its heat collecting mode is controlled by means for regulating fluid flow through the fluid conduit contained in the collector panel by a clock timer. That is to say, the automatic solar collector system of this invention will commence operation and secure itself in response to predetermined start-stop commands from the clock timer. It is, of course, to be understood that intermittent control of fluid flow will also be effected by standard temperature sensors and comparator units incorporated within the circuit defining the means for regulating fluid flow.

As will become apparent from the detailed description of a preferred embodiment presented hereinafter, the automatic solar collector system of this invention is essentially self-contained and may be mounted upon a movable support structure such as, for example, a trailer assembly. Thus, while providing a more efficient collector system primarily because of its means for positioning the solar collector panel, the system is extremely flexible and suitable for use in a great variety of end use applications. In face, all that is required to make the automatic solar collector system operational is to provide an inlet and an outlet for the heat exchange fluid and to provide electrical service to the means for regulating fluid flow.

The invention accordingly comprises the features of construction, combination of elements, and arrangement of parts which will be exemplified in the preferred construction hereinafter set forth, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings, in which:

FIG. 1 is a front, elevational view of the automatic solar collector system with the solar collector panel shown partially in section to illustrate interior detail.

FIG. 2 is a side, elevational view of the system shown in FIG. 1, partially in section, and illustrating the means for positioning the solar collector panel in predetermined relation to the sun's rays in phantom.

FIG. 3 is a schematic representation of the means for regulating fluid flow, including the electrical components of the means for positioning the solar collector panel.

Similar reference characters refer to similar parts throughout the several views of the drawings.

DETAILED DESCRIPTION

The automatic solar collector system of the present invention is generally indicated as 10 in the views of FIGS. 1 and 2. As perhaps best seen in the side view of FIG. 2, the automatic solar collector system 10 comprises a solar collector panel 12 which is pivotally attached to panel box 14 as by pin 16 which passes through panel bracket 18 and box bracket 20.

As indicated in the views of FIGS. 1 and 2, solar collector panel 12 is of substantially rectangular configuration defined by a support frame including side walls 22 and back 24. Back 24 is line with an insulating material such as, for example, styrofoam, and side walls 22 may be similarly lined. Disposed within the collector panel 12 is a continuous length of fluid conduit 26. Though not shown in the drawing figures, one end of fluid conduit 26 is provided with a fitting for connection to a fluid supply source, while the other end of fluid conduit 26 is operatively connected to a storage tank 28 mounted within panel box 14 as indicated in phantom in the view of FIG. 2. It is, of course, to be understood that an outlet line would extend from storage tank 28 whereby heated fluid could be withdrawn for end use.

With reference to the view of FIG. 1, it can be seen that the open top of the solar collector panel 12 is provided with a plurality of lens racks 30 disposed thereacross from side to side whereby fresnel lenses 32 may be inserted so that the focal point of each lens 32 will substantially coincide with a segment of fluid conduit 26. Overlying the plurality of lenses 32 is a continuous sheet of light-transmissive material such as, for example, sheet plastic 34. Plastic 34 not only serves to protect each of the lenses 32, but also provides a substantially airtight front closure for panel box 14.

Referring once again to the view of FIG. 2, one may observe a preferred construction for the mechanical elements of the means for positioning solar collector panel 12 in predetermined relation to the sun's rays. The means for positioning comprises a photo cell 36 attached to one of the side walls 22 of collector panel 12 as by bracket 38. An electrical conduit 40 extends from cell 36 through aperture 42 formed in a wall of panel box 14, and then is electrically connected through the means for regulating fluid flow, generally indicated as 44, to hydraulic pump 46. Hydraulic pump 46 includes a source of hydraulic fluid (not shown) and is operatively connected to hydraulic cylinder 48 by hydraulic fluid conduit 50 which extends from pump 46 through second aperture 52 to the cylinder 48. A first end 54 of cylinder 48 is attached to panel box 14, and its second end 56 is attached to a side wall 22 of solar collector panel 12.

By virtue of this construction, when timer clock 58, which is an element of the means for regulating fluid flow 44, reaches its pre-set start time, hydraulic pump 46 will be actuated to cause rod 60 of hydraulic cylinder 48 to extend as shown in phantom in the view of FIG. 2. By virtue of the pivotal connection between solar collector panel 12 and panel box 14 by virtue of pin 16, the solar collector panel 12 will move in response to the extension of rod 60. Photo cell 36 will sense maximum sun ray intensity and secure the operation of hydraulic pump 46, thereby positioning the front plane of solar collector panel 12 in predetermined relation to the sun's rays, that predetermined relation being essentially normal.

Attention is now invited to a description of the means for regulating fluid flow 44 as schematically depicted in the view of FIG. 3. While the scope of the present invention is not to be limited to the precise circuit illustrated in FIG. 3, it does illustrate temperature sensors, relays, and solenoid valves which, while desirable for efficient operation of the system 10, are well known and form no part of applicant's invention, and are thus not described in detail. The means for regulating fluid flow 44 is powered by standard 115 volt alternating current initially supplied and regulated through main switch 62. A main fuse 64 protects the overall circuit, while four separate fuses are provided for internal sub-circuits. Hydraulic pump circuit 66 is protected by first fuse 68.

The means for positioning solar collector panel 12 in predetermined relation to the sun's rays is generally indicated as sub-circuit 70 and is protected by second fuse 72. Operation of water pump 74 which is used to circulate water through fluid conduits 26 is controlled by sub-circuit 76, and that water pump sub-circuit 76 is protected by third fuse 78. Finally, a cycling temperature control sub-circuit 80, protected by fourth fuse 82 is provided.

Referring to the means for positioning sub-circuit 70, it can be seen that start and stop operations are controlled by timer clock 58 in combination with timer switch 84. When normally open timer switch 84 is closed by timer clock 58, sampling photo cell 86, if activated by ambient sunlight, will cause switches 88 and 90 to close, thereby permitting passage of hydraulic fluid through solenoid valve 92 to operate hydraulic cylinder 48. Mechanical limits are imposed upon the extension of rod 60 from hydraulic cylinder 48 by down limit switch 94 and up limit switch 96. As already indicated above, photo cell 36 will operate to secure solenoid valve 92 when solar collector panel 12 is positioned to receive substantially normal incidence of the sun's rays. Signal light 98 indicates normal operation of the means for positioning sub-circuit 70, and relays 100 provide electrical interconnection between sub-circuit elements. Finally, the means for positioning sub-circuit further comprises a high temperature thermostat 102 whereby the solar collector panel 12 will be returned to its substantially vertical, non-functional position as indicated in solid lines in the view of FIG. 2 should the water temperture within fluid conduit 26 reach a predetermined upper limit.

In combination with sub-circuits 66, 70 and 76, the cycling temperature control sub-circuit 80 regulates other relatively standard functions of the automatic solar collector system 10. A cycling thermostat is provided having a low temperature side 104 and a high temperature side 106. A cycle timer 108 permits the entry of water into fluid conduits 26 through solenoid valve 110 in predetermined quantities. Only when the water within conduit 26 has reached a predetermined temperature will circulating solenoid valve 112 open to permit passage of the heated water into storage tank 28. Furthermore, if the level of heated water within storage tank 28 attains a predetermined high level, float switch 114 will prevent overfilling. A low, or less than full, level of heated water within storage tank 28 is indicated by low level indicator light 116, while full tank indicator light 118 will be energized to indicate that storage tank 28 contains its preset capacity. The withdrawal of heated water for end use is sensed by utility pressure switch 120 which will close to open the normally closed utility solenoid valve 122. A plurality of relays 124 provide electrical interconnection among the various sub-circuit elements.

Having thus set forth a detailed description for a preferred embodiment of the automatic solar collector system 10, it can be seen that a compact, self-contained unit capable of significantly maximizing its heat transfer and storage capabilities through utilization of the means for positioning sub-circuit 70 is provided. It is again to be emphasized that the construction and circuitry shown in the drawing figures and described hereinabove are presented as a preferred embodiment so as to enable any person skilled in the art to make and use the system 10. Engineering or design modifications could obviously be made to both the hardware and the circuitry without departing from the scope of this invention. It is also to be understood that the automatic solar collector system 10 might be mounted on a movable frame for transportation among a variety of locations. It is further contemplated that the system 10 would also include freeze protection in the form of a freeze dump valve. The valve would be electrically controlled in response to outside air temperature. When the ambient temperature reached a predetermined minimum, the valve would be energized to drain water from fluid conduit 26.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described, wat is claimed is:

1. An automatic solar collector system for collecting solar energy in a heat transfer fluid and for storing the heated fluid for subsequent use, said collector system comprising: a solar collector panel comprising an insulated support frame having a heat exchange fluid conduit mounted therein, said conduit being operatively connected to a fluid supply at one end thereof and being operatively connected to a heated fluid storage tank at the other end thereof, said collector panel further comprising cover means defined by a plurality of lenses whereby the sun's rays may be focused along said fluid conduit; a panel box disposed in supporting relation to said collector panel whereby said collector panel is pivotally supported by said panel box, and wherein said panel box includes means for regulating fluid flow through said conduit and into the storage tank, the storage tank being insulated and mounted within said panel box; means for positioning said solar collector panel comprising an hydraulic cylinder disposed in interconnecting relation between said collector panel support frames and said panel box, said means for positioning further comprising a photo cell mounted on said collector panel support frame and operatively connected to said hydraulic cylinder through said means for regulating fluid flow to control the operation of said hydraulic cylinder to position said solar collector panel in predetermined receiving relation to the sun's rays; said means for positioning further comprising a thermostat mounted in temperture sensing relation to the heated fluid and operatively connected to said hydraulic cylinder through said means for regulating fluid flow to control the operation of said hydraulic cylinder to position said solar collector panel in a non-receiving relation to the sun's rays.

2. An automatic solar collector system for collecting solar energy in a heat transfer fluid and for storing the heated fluid for subsequent use, said collector system comprising: a solar collector panel for heating a circulating transfer fluid, said collector panel including a support frame having a heat exchange fluid conduit mounted therein, said conduit being operatively connected to a fluid supply at one end thereof and being operatively connected to a heated fluid storage tank at the other end thereof, said collector panel further including cover means for directing the sun's rays onto said conduit; a panel box disposed in supporting relation to said collector panel, said panel box including means for regulating fluid flow through said conduit and including the storage tank mounted therein in fluid receiving relation to said other end of said conduit; and means for positioning said solar collector panel comprising an hydraulic cylinder disposed in interconnecting relation between said collector panel support frames and said panel box, said means for positioning further comprising a photo cell mounted on said collector panel support frame and operatively connected to said hydraulic cylinder through said means for regulating fluid flow to control the operation of said hydraulic cylinder to position said solar collector panel in predetermined relation to the sun's rays, said means for positioning further comprising a thermostat mounted in temperature sensing relation to the heated fluid and operatively connected to said hydraulic cylinder through said means for regulating fluid flow to control the operation of said hydraulic cylinder to position said solar collector panel in a non-receiving relation to the sun's rays.

3. An automatic solar collector system as in claim 2 wherein said cover means comprises a plurality of lenses, whereby the sun's rays are focused along said fluid conduit.

4. An automatic solar collector system as in claim 2 wherein said collector panel is pivotally supported by said panel box.

5. An automatic solar collector system as in claim 2 wherein said collector panel and the storage tank are insulated to reduce radiant heat loss therefrom.

6. An automatic solar collector system as in claim 2 wherein said means for regulating comprises a clock timer.

* * * * *